(12) United States Patent
Aronov et al.

(10) Patent No.: US 11,153,297 B2
(45) Date of Patent: Oct. 19, 2021

(54) SYSTEMS AND METHODS TO FACILITATE CERTIFICATE AND TRUST MANAGEMENT ACROSS A DISTRIBUTED ENVIRONMENT

(71) Applicant: VMware, Inc., Palo Alto, CA (US)

(72) Inventors: Evgeny Aronov, Sofia (BG); Zahari Ivanov, Sofia (BG); Dimitar Hristov Barfonchovski, Sofia (BG); Anna Delcheva, Sofia (BG); Diana Kovacheva, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 221 days.

(21) Appl. No.: 15/370,626

(22) Filed: Dec. 6, 2016

(65) Prior Publication Data
US 2018/0159845 A1 Jun. 7, 2018

(51) Int. Cl.
H04L 29/06 (2006.01)
H04L 9/32 (2006.01)
H04L 9/00 (2006.01)

(52) U.S. Cl.
CPC .......... *H04L 63/0823* (2013.01); *H04L 9/007* (2013.01); *H04L 9/3268* (2013.01);
(Continued)

(58) Field of Classification Search
CPC ............... H04L 63/0823; H04L 9/3247; H04L 63/0435; H04L 63/0442; G06F 9/45533;
(Continued)

(56) References Cited

U.S. PATENT DOCUMENTS 8,739,257 B1 5/2014 Robinson
9,092,248 B1 7/2015 Makin et al.
(Continued)

OTHER PUBLICATIONS

United States Patent and Trademark Office, "Non-Final Office action," issued in connection with U.S. Appl. No. 15/370,677 dated Aug. 27, 2018, 14 pages.
(Continued)

*Primary Examiner* — Eleni A Shiferaw
*Assistant Examiner* — Bassam A Noaman
(74) *Attorney, Agent, or Firm* — Hanley, Flight & Zimmerman, LLC

(57) ABSTRACT

Methods and apparatus to facilitate certificate and trust management across a distributed environment are disclosed. An example apparatus includes a first virtual appliance including a first management endpoint and a first authentication provider including a first certificate validator, the first certificate validator to validate that a first certificate received by the first authentication provider is authentic, virtual appliance to communicate the first certificate via the first management endpoint; and a first component server including a first management agent and a first certificate evaluator, the first management agent to communicate with the first virtual appliance via the first management endpoint, the first management agent to receive the first certificate via the first management endpoint, the first certificate evaluator to evaluate the first certificate to determine a signing authority, the first management agent to restart the first component server and notify the first virtual appliance of acceptance of the first certificate.

21 Claims, 10 Drawing Sheets

(52) U.S. Cl.
CPC ...... *H04L 63/0435* (2013.01); *H04L 63/0442* (2013.01); *H04L 2209/64* (2013.01)

(58) Field of Classification Search
CPC ............. G06F 9/45558; G06F 11/1484; G06F 2212/15
See application file for complete search history.

(56) References Cited

U.S. PATENT DOCUMENTS

| | | | |
|---|---|---|---|
| 9,152,446 | B2 | 10/2015 | Ansel |
| 9,386,079 | B2 | 7/2016 | Ramalingam et al. |
| 9,471,474 | B2 | 10/2016 | Gurumurthy et al. |
| 9,773,122 | B2 | 9/2017 | Betzler et al. |
| 2007/0174658 | A1 | 7/2007 | Takamoto et al. |
| 2008/0134176 | A1 | 6/2008 | Fitzgerald et al. |
| 2008/0320583 | A1* | 12/2008 | Sharma .................. G06F 21/57 726/12 |
| 2010/0293409 | A1 | 11/2010 | Machida |
| 2011/0154320 | A1 | 6/2011 | Verma |
| 2011/0173605 | A1 | 7/2011 | Bourne |
| 2012/0054486 | A1 | 3/2012 | Lakkavalli et al. |
| 2012/0117381 | A1* | 5/2012 | Lo .......................... G06F 8/63 713/156 |
| 2012/0233299 | A1 | 9/2012 | Attanasio et al. |
| 2013/0018994 | A1 | 1/2013 | Flavel et al. |
| 2013/0232497 | A1 | 9/2013 | Jalagam et al. |
| 2013/0247136 | A1 | 9/2013 | Chieu et al. |
| 2013/0297964 | A1 | 11/2013 | Hegdal et al. |
| 2014/0208111 | A1* | 7/2014 | Brandwine ......... H04L 63/0428 713/171 |
| 2015/0052402 | A1 | 2/2015 | Gurumurthy et al. |
| 2015/0074743 | A1 | 3/2015 | Ilieva et al. |
| 2015/0150111 | A1* | 5/2015 | Friedmann ............ H04W 12/06 726/9 |
| 2015/0180653 | A1* | 6/2015 | Nix ........................ H04W 4/70 380/259 |
| 2015/0215308 | A1* | 7/2015 | Manolov ............. H04L 63/0823 709/229 |
| 2015/0222604 | A1* | 8/2015 | Ylonen ................. H04L 63/062 713/171 |
| 2015/0312116 | A1 | 10/2015 | Taheri et al. |
| 2015/0324182 | A1 | 11/2015 | Barros et al. |
| 2015/0339113 | A1* | 11/2015 | Dorman ................ H04L 63/123 717/169 |
| 2015/0347264 | A1 | 12/2015 | Mohammed et al. |
| 2015/0358392 | A1 | 12/2015 | Ramalingam et al. |
| 2016/0142409 | A1* | 5/2016 | Frei ..................... H04L 63/0884 713/176 |
| 2016/0285832 | A1* | 9/2016 | Petrov ................. H04L 63/0428 |
| 2017/0222981 | A1* | 8/2017 | Srivastav ............ H04L 63/0428 |
| 2018/0157550 | A1 | 6/2018 | Ivanov et al. |
| 2018/0159721 | A1 | 6/2018 | Delcheva et al. |
| 2018/0159844 | A1 | 6/2018 | Barronchovski et al. |

OTHER PUBLICATIONS

United States Patent and Trademark Office, "Non-Final Office action," issued in connection with U.S. Appl. No. 15/370,569, dated Sep. 7, 2018, 21 pages.

United States Patent and Trademark Office, "Notice of Allowance," issued in connection with U.S. Appl. No. 15/370,677, dated Feb. 14, 2019, 23 pages.

United States Patent and Trademark Office, "Non-Final Office action," issued in connection with U.S. Appl. No. 15/370,477, dated Jun. 13, 2019, 29 pages.

United States Patent and Trademark Office, "Notice of Allowance," issued in connection with U.S. Appl. No. 15/370,569, dated Jun. 3, 2019, 37 pages.

United States Patent and Trademark Office, "Final Office action" issued in connection with U.S. Appl. No. 15/370,477, dated Dec. 26, 2019, 15 pages.

\* cited by examiner

SYSTEMS AND METHODS TO FACILITATE CERTIFICATE AND TRUST MANAGEMENT ACROSS A DISTRIBUTED ENVIRONMENT

FIELD OF THE DISCLOSURE

The present disclosure relates generally to cloud computing and, more particularly, to methods and apparatus to facilitate certificate and trust management across a distributed environment such as a cloud computing environment.

BACKGROUND

Virtualizing computer systems provide benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

DETAILED DESCRIPTION

Figure 1:
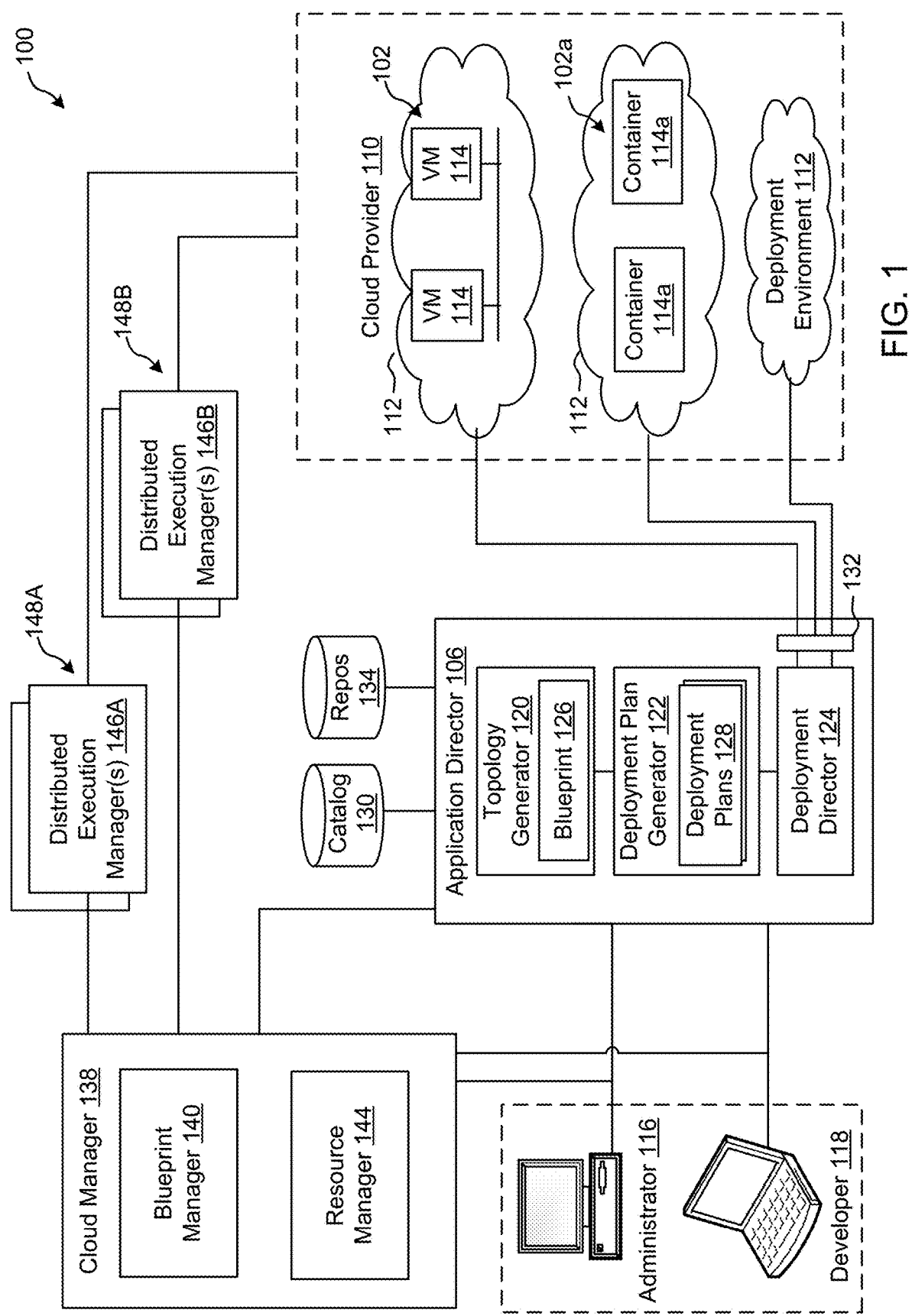
FIG. 1 depicts an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vCloud Automation Center (vCAC) from VMware®, the vRealize Automation Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device. etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
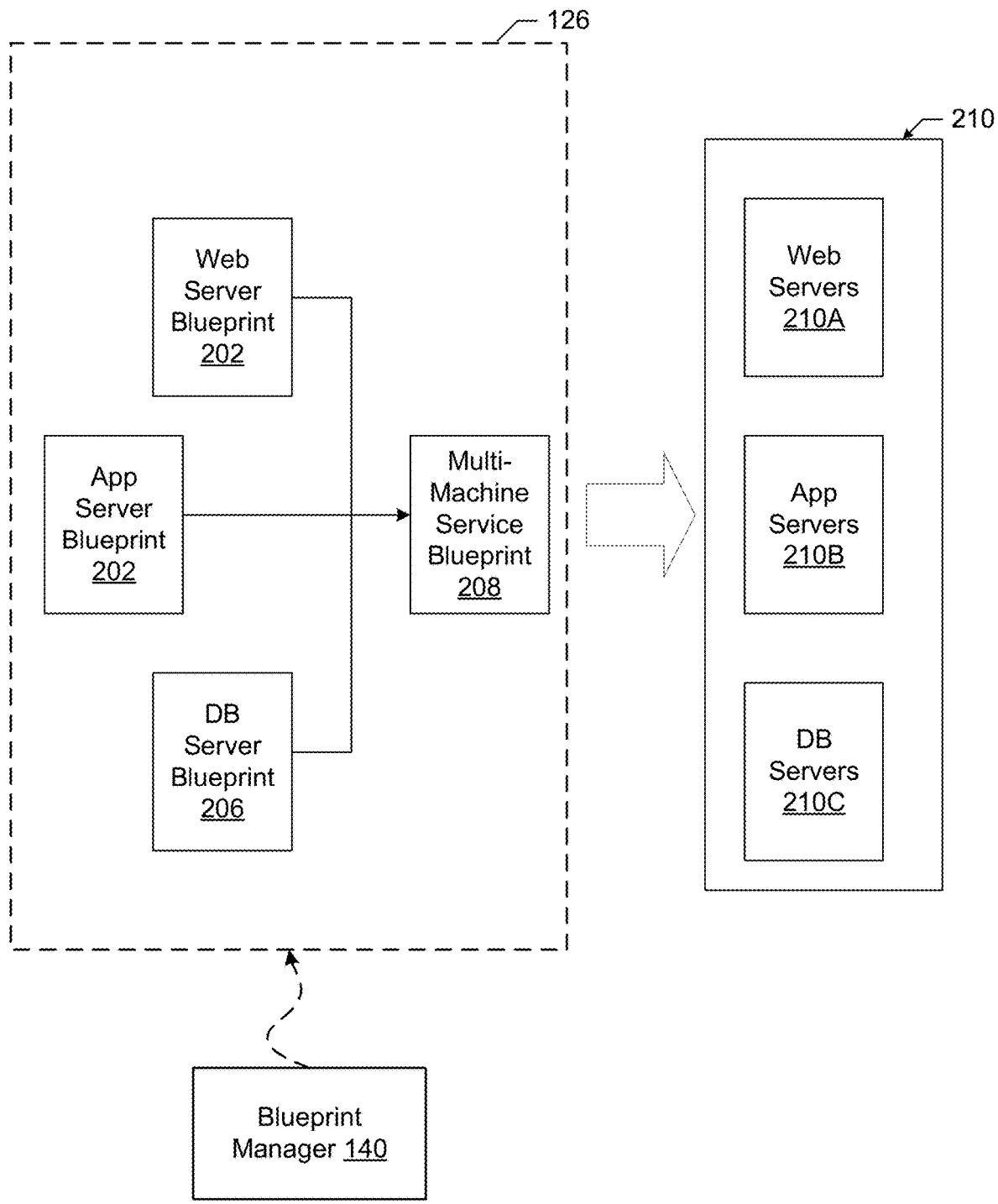
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premise virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular State in which a resource is physically located. Thus, a single disk image may be utilized for multiple multi-machine blueprints reducing the amount of storage space for storing disk images compared with storing a disk image for each customized setting.

Figure 3:
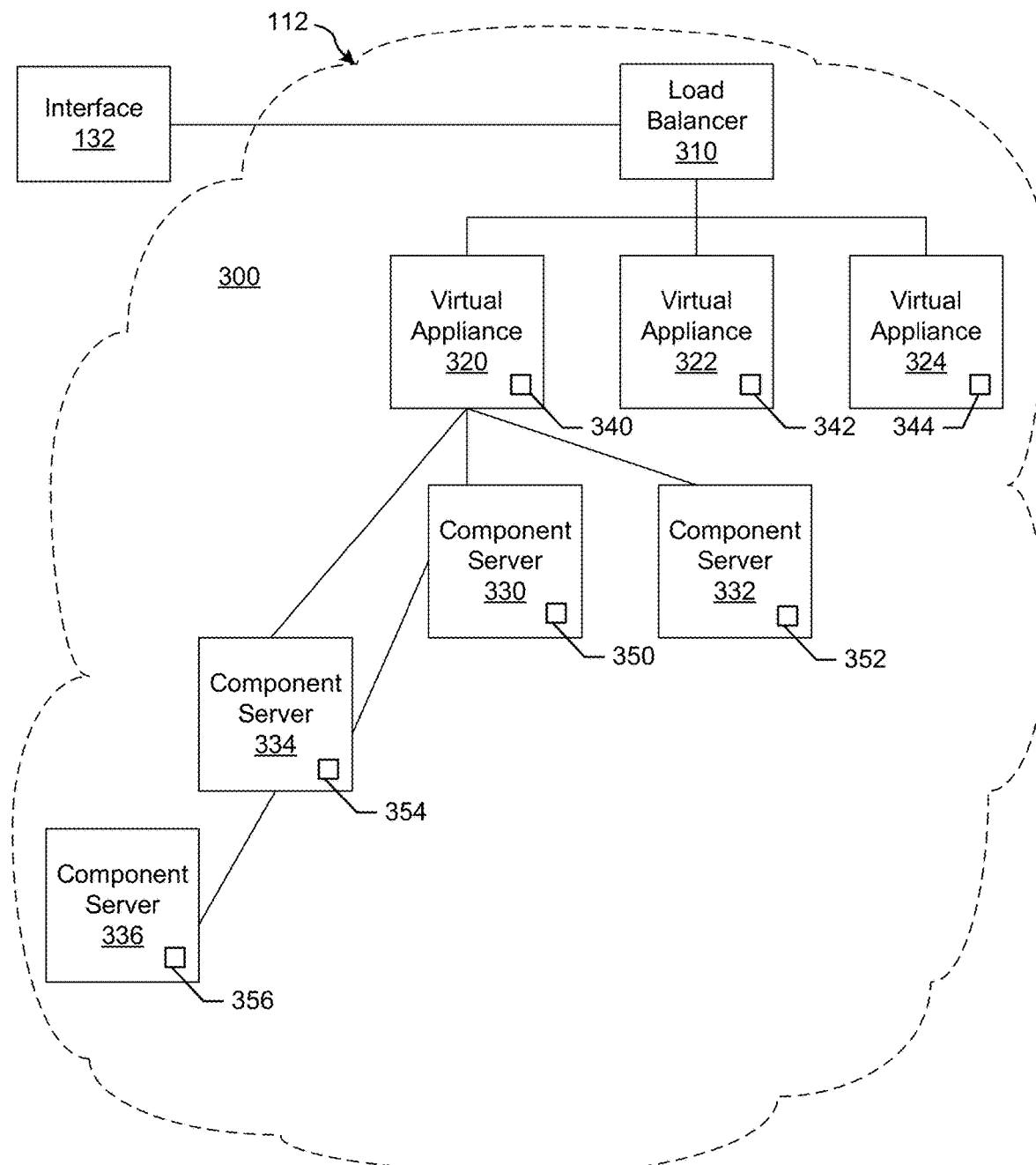
FIG. 3 illustrates an example installation of deployed virtual machines and associated servers acting as hosts for deployment of component servers for a customer.

FIG. 3 illustrates an example installation of deployed appliances or virtual appliances (vAs) (e.g., VMs 114 and/or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premise automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 and/or container 114a. In this example, the vA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3, component servers 334, 336 can stem from component server 330 rather than (or in addition to) directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, the management agents 350-356 synchronize component servers 330-336 with the vA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (vA) 320 is accessing different servers 330-336 depending upon what functionality is to be executed.

In certain examples, agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4:
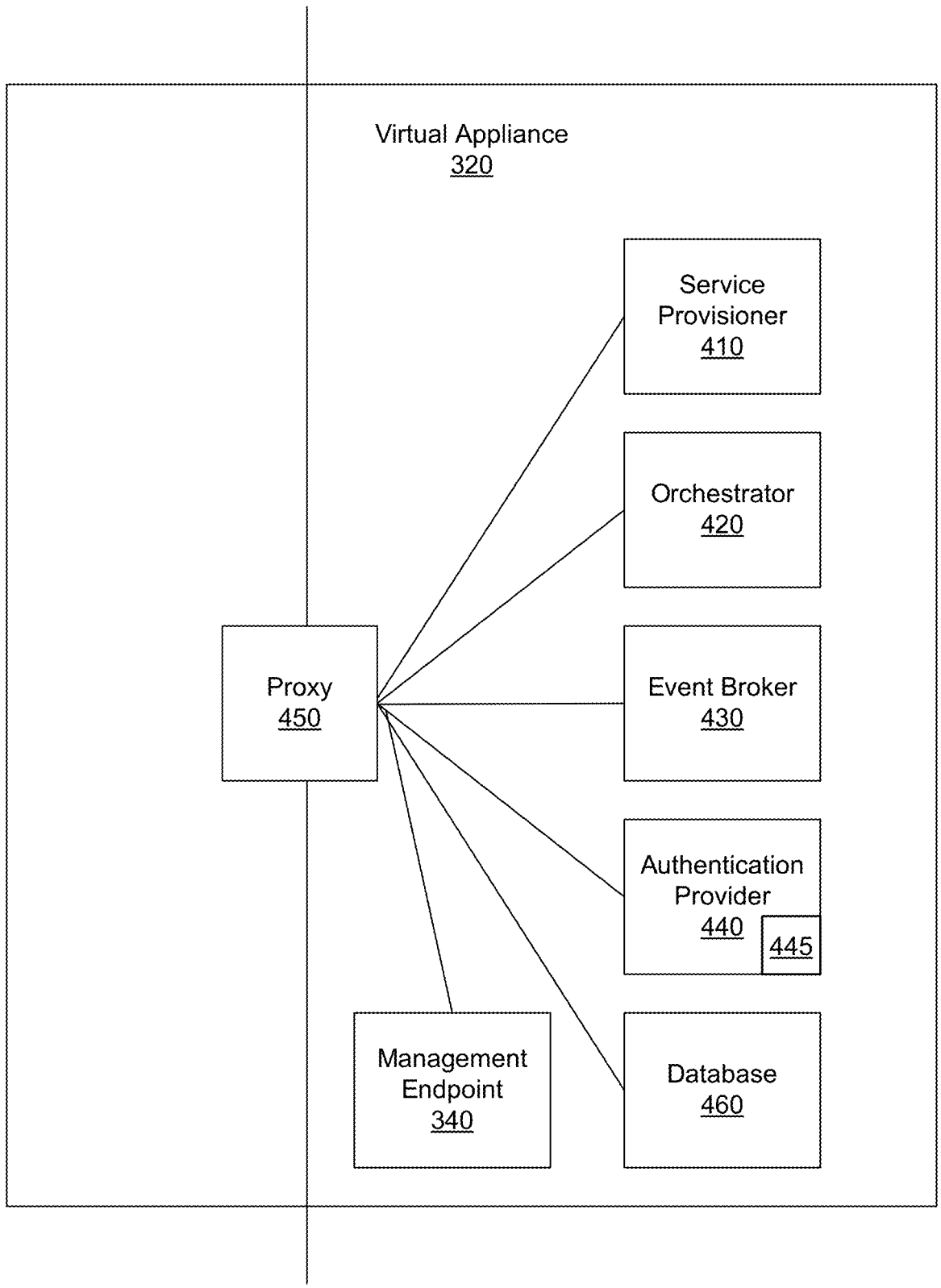
FIG. 4 illustrates an example implementation of a virtual appliance.

FIG. 4 illustrates an example implementation of the vA 320. In the example of FIG. 4, the vA 320 includes a service provisioner 410, an orchestrator 420, an event broker 430, an authentication provider 440, an internal reverse proxy 450, and a database 460, as well as the management endpoint 340. The components 410, 420, 430, 440, 450, 460 of the vA 320 may be implemented by one or more of the VMs 114. The example service provisioner 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or cloud manager 138, to provision VM services but is embedded in the vA 320. For example, the vCO 420 can be used to invoke a blueprint to provision a manager for services.

Example services can include catalog services, identity services, component registry services, event broker services, IaaS, XaaS, etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The event broker provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

The example event broker 430 provides a mechanism to handle tasks which are transferred between services with the orchestrator 420. The example authentication provider 440 (e.g., VMware Horizon™ services, etc.) authenticates access to services and data, for example. The authentication provider 440 can facilitate authentication and registration of certificate(s) to allow communication between the management endpoint 340 and one or more management agents 350-356, for example. In certain examples, the authentication provider 440 includes a certificate validator 445 to validate and/or otherwise verify authenticity and applicability of a certificate to communication and/or service provisioning for the agent 350-356 and associated component sever 330-336 with respect to the vA 320.

The components of the vA 320 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

Example Infrastructure Installation

In certain examples, a cloud computing (e.g., vCAC™ vRA™ etc.) deployment includes one or more vAs 320-324 and one or more component servers 330-336 (e.g., Microsoft Windows™ machines, etc.) on which are installed components (e.g., software such as Web services, application services, database services, etc.) that form the IaaS portion of the product. In a distributed and/or high availability deployment, a plurality of component servers 330-336 form the installed product, and having to install and configure the IaaS components manually on all of the component servers 330-336 is a time-consuming process, involving, among other things, multiple context switches and many opportunities for user misconfiguration of the deployed system. For example, manual installation involves installing components on an appliance, downloading an installer, and then visit each server to install the components manually using the installer. However, if a component is deployed out of order, the installation may not function. Additionally, data entry is required for each manual installation, and mis-typing of the manual data entry can invalidate the entire installation. Further, such a mistake may not be realized until the erroneous installation is deployed, resulting in lost time, money, errors, and inoperable systems. Simplification and automation of this process reduces the time needed and errors involved in setting up a new instance of the cloud computing system.

In certain examples, rather than requiring customers to manually install an IaaS component on each server 330-336, installation can be executed on each node from a centralized location via the management agent 350-356 installed on each component server 330-336. Since the main appliance 320 may not be able to see the component server(s) 330-336, the vA 320 can communicate with the servers 330-336 through installation of the management agent 350-356, which can communicate with the management endpoint 340 of the vA 320. The agent 350-356 is installed and registered with the vA 320. After registration, communication with the vA 320 is authenticated using a self-signed certificate and/or a certificate signed by a certificate authority (CA). The vA's 320 root credentials are not persisted on the server 330-336. Each instance of the management agent 350-356 has a node identifier (ID), which uniquely identifies the agent 330-336 in a cluster of machines 330-336 forming the cloud deployment. When installing the agent 350-356, an address and root credentials of the primary vA 320 are entered so that the agent 350-356 can register itself in the vA 320.

More specifically, when the customer installs an instance of the management agent 350-356, the agent 350-356 is registered in the vA 320. The agent 350-356 also registers its self-signed certificate that can be used to authenticate to the vA 320 after the self-signed certificate is registered. The agent 350 also stores an identifier (e.g., a system management basic input/output system (SMBIOS) universally unique identifier (UUID), globally unique identifier (GUID), etc.) associated with the component server 330-336 in a configuration file for the agent 350-356. On startup of a service associated with the agent 350-356, the agent 350-356 checks whether the identifier (e.g., SMBIOS UUID, GUID, etc.) associated with its server 330-336 is the same as the identifier recorded in its configuration file. If the identifiers match, then the server 330-336 is registered and can execute its function in the system 300 with respect to the vA 320. If the identifiers are missing and/or do not match, then the server 330-336 is not properly registered, and their agent 350-356 begins a procedure to register with the vA 320. A new node identifier and a new self-signed certificate are generated for the agent 350-356. Using a key and/or old certificate and old node identifier present on the server 330-336 (e.g., an old certificate trusted by the vA 320 but now being updated/replaced, etc.), the management agent 350-356 registers with the vA 320 using the new node identifier and self-signed certificate. Upon successful registration, the old node identifier and old certificate are removed from the server 330-336, and the new identifier is stored in the configuration file for the server 330-336.

After the registration, communication with the vA 320 is authenticated using a client certificate. Since the client certificate is used for communication between the agent 350-356 and the endpoint 340, the root credentials of the vA 320 are not persisted on the machines 330-336. After registration, the agent 330-336 starts polling the vA 320 in a configurable time interval to obtain commands to be executed. The commands are executed by the corresponding server 330-336, and a result is reported back to the vA 320 by the agent 350-356 and can be used for further processing, for example.

Figure 5:
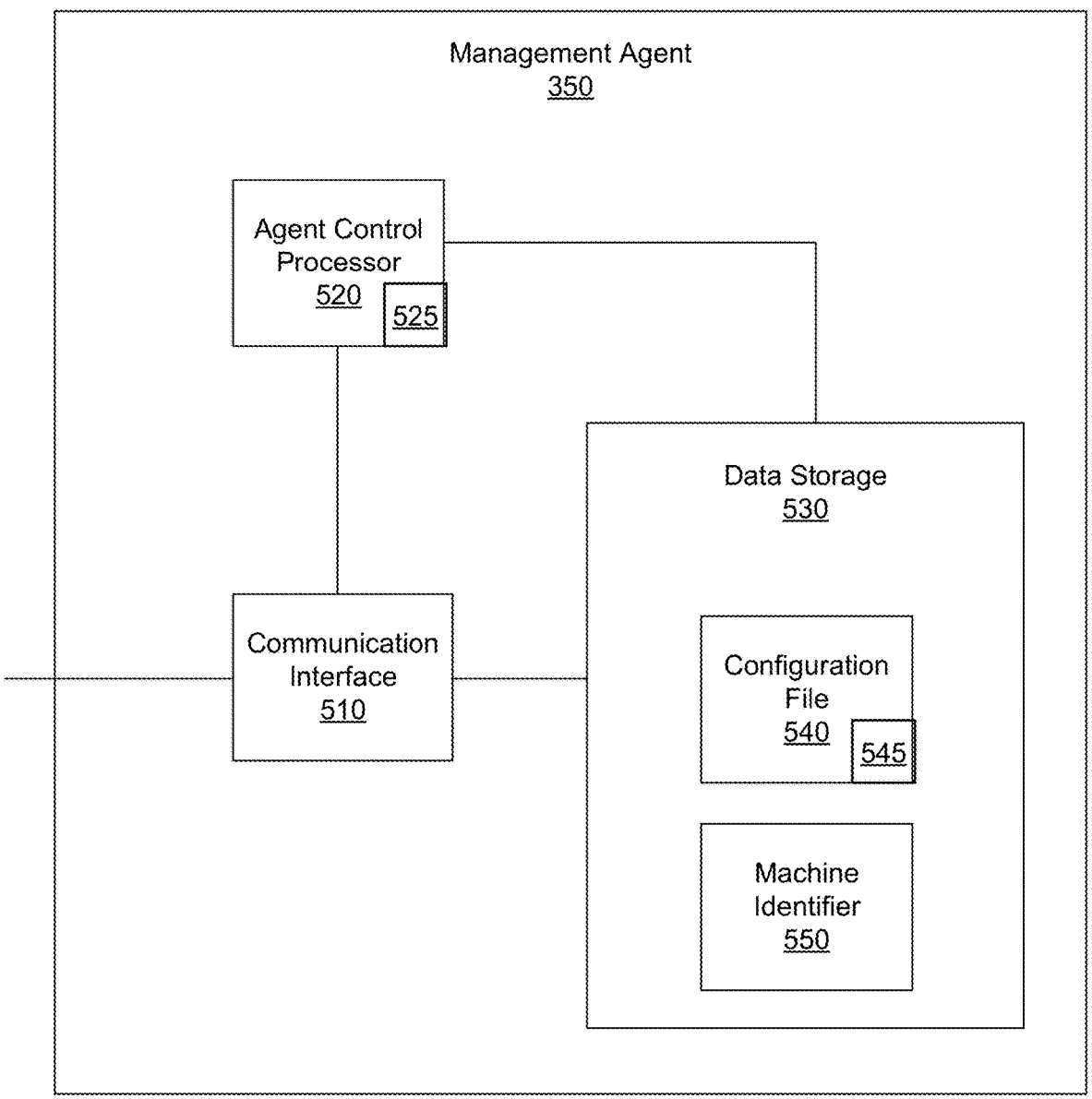
FIG. 5 illustrates a block diagram of an example implementation of a management agent.

FIG. 5 illustrates a block diagram of an example implementation of the management agent 350 (and/or 352, 354, 356). As shown in the example of FIG. 5, the management agent 350 includes a communication interface 510 through which the agent 350 can communicate with the endpoint 340 (and/or 342, 344) of the vA 320 (and/or 322, 324). The communication interface 510 is a hardware and/or software interface allowing the agent 350 to exchange data, commands, etc., with the endpoint 340 and/or other communication node, for example.

The example agent 350 also includes an agent control processor 520. The agent control processor 520 executes instructions to control the agent 350 for command and/or other application execution, communication, storage, etc. The instructions can be transmitted to the agent control processor 520 via the communication interface 510 and/or via a data storage 530, for example.

In certain examples, the agent control processor 520 includes a certificate evaluator 525. The example certificate evaluator 525 evaluates a certificate 545 to verify that the certificate and its authority can be trusted, and the agent control processor 520 binds the certificate to the component server 330 to be used in communication between the management agent 350 and the management endpoint 340, for example.

The example data storage 530 includes a configuration file 540 and a machine identifier 550. The example configuration file 540 can include information such as credentials to authenticate and/or validate the agent 350 to the vA 320, etc. Credentials can include a certificate 545 (e.g., with a public key and private key for authentication, etc.), a unique identifier, etc. The example agent control processor 520 can process instructions, generate communications, etc. The example data storage 530 can also include instructions (e.g., computer program code, etc.) to be executed by the agent control processor 520. The agent control processor 520 can process and store the certificate 545 as part of the configuration file 540 in the data storage 530.

In certain examples, a plurality of virtual appliances 320-324 are deployed with a plurality of component servers 330-336 in a high availability (HA) environment. Changing certificates in a HA environment is complicated and difficult and, in many cases, leads to breaking up the system 300. In certain examples, however, a secure solution is provided that allows for the certificates in the system 300 to be managed from a centralized place (e.g., the vA 320 and its authentication provider 440 and certificate validator 445) in a HA environment. This solution allows for both CA signed and self-signed certificates to be applied and/or changed to a distributed virtual environment. In certain examples, the main appliance vA 320 (which provides the certificate management) is not guaranteed to have access to the servers 330-336 it manages. However, the vA 320 is still able to facilitate authentication, binding, and communication with the certificate through interaction between the management endpoint 340 and the management agent 350, for example.

Thus, certain examples can operate in an environment in which the managed server(s) 330-336 are not directly accessible from the appliance 320 that manages them. Additionally, in certain examples, services independent of the product are leveraged to manage components that are not necessarily operational at the moment of certificate management.

In certain examples, a secure management channel is established by deploying the management endpoint 340 on the main appliance vA 320 and deploying a management agent 350-356 on each server 330-336 available with respect to the vA 320. During installation, the management agents 350-356 generate a private/public key pair and register with the vA 320 (e.g., by sharing its public key). During a product lifetime, the management agent 350-356 polls the management endpoint 340 for events. The management endpoint 340 has information for each server 330-336 in the deployment 300 and knows what services are running on each server 330-336.

When a certificate change operation is performed, the main endpoint 340 accepts (or generates) the new certificate. The endpoint 340 issues a command for the server(s) 330-336 that run the service whose certificate is being managed to upload the certificate (e.g., by deploying them to a certificate store), and reconfigure the server(s) 330-336 to use the new certificate (e.g., update certificate of an https port binding, etc.). Then, a notification event is published to all servers 330-336 in the installation 300. If the certificate is signed by a certificate authority, the certificate and its associated communication are trusted. Additionally, if a self-signed certificate is used, the system automatically enforces the trust to the dependent component (e.g., deploying the certificate in an appropriate place such as a trusted people store on a Windows™ server, etc.).

In certain examples, the certificate is a chain of one or more certificates organized in a hierarchy according to a certificate/certification authority (CA). In certain examples, a hierarchical CA trust model, also referred to as a certification hierarchy, provides a scalable parent-child hierarchy of one or more CA-signed certificates. The CA at the top of the hierarchy is referred to as a root CA (RCA). Root CAs are self-certified using a self-signed CA certificate. Root CAs are the most trusted CAs and can be associated with a highest level of security, for example. Child or subordinate CAs are certified by a parent CA (e.g., the RCA, etc.). The parent CA certifies the child CA by issuing and signing the subordinate CA certificate. A subordinate CA can be an intermediate CA (ICA) or an issuing CA. An intermediate CA issues certificates only to subordinate CAs, and an issuing CA issues certificates to users, computers, services, etc.

Figure 6:
FIG. 6. illustrates an example system configuration in which the management endpoint and the management agent communicate with a trigger.

As shown in the example of FIG. 6, the management endpoint 340 and the management agent 350 communicate with a trigger 610. The trigger 610 can be a user, an automated script and/or other program, other external input, etc. The trigger 610 can initiate installation, deployment, certificate authentication, and/or other action with respect to the vA 320 and/or the component server 330 via the endpoint 340 and agent 350. Similarly, the trigger 610 can initiate action with respect to other vA 322-324, component server 332-336, etc., via the endpoint 342-344, agent 352-356, etc.

Figure 7:
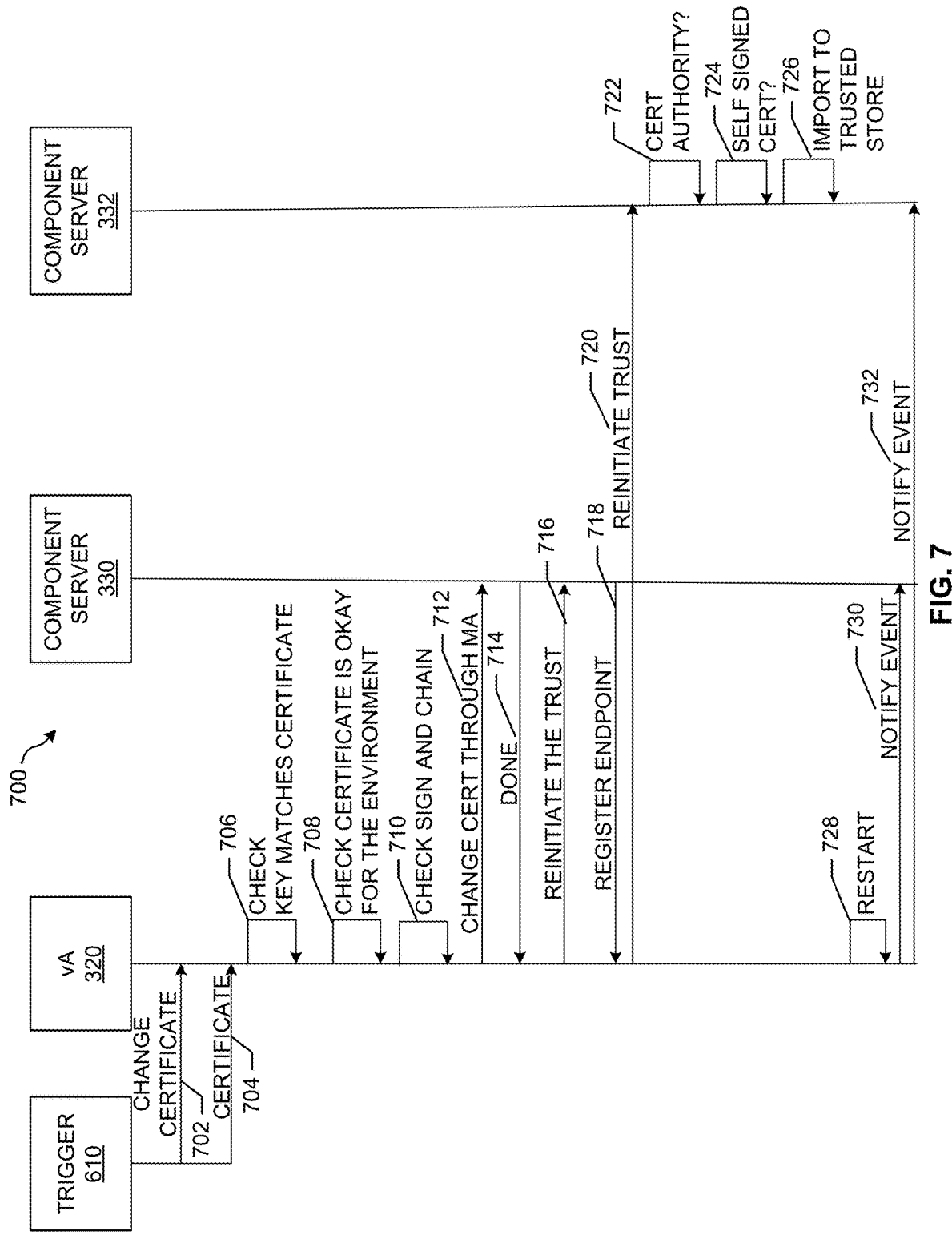
FIG. 7 illustrates an example data flow diagrams showing an exchange of information between an appliance and a component server to validate and deploy a certificate.

FIG. 7 illustrates an example data flow diagram showing an exchange of information 600 between the trigger 610, the vA 320, and component servers 330, 332 to validate and deploy a certificate for communication and execution of applications and/or other services (e.g., Web services, application services, manager services, database services, etc.). While the example is described with respect to the vA 320, component server 330, and component server 332, certificate verification, binding, and trust can also occur with respect to vA 322, 324, component servers 334-336, management agents 354-356, etc. Previously, server registration required role credentials of the appliance 320, which are not stored on the server 330 and then must be provided manually. However, in certain examples, the server 330 has been authenticated and registered, and trust has been exchanged between the server 330 and the vA 320 via the agent 350 using the certificate 545.

As shown in the example of FIG. 7, at 602, the trigger 610 (e.g., a user via a vA management webpage, an automated script, etc.) initiates a change in certificate at the vA 320. At 704, the new certificate is provided to the vA 320. At 706, the vA 320 and its certificate validator 445 check a key (e.g., a public key, etc.) associated with the certificate to determine whether the key matches the certificate (e.g., a corresponding private key, etc.). At 708, the certificate validator 445 checks the certificate to determine it is applicable for the intended purpose/environment. For example, the certificate validator 445 can determine whether the certificate matches a web node address if the certificate is to be used for the web node, etc. The certificate validator 445 can also check the certificate common name (CN) of the certificate to determine whether the CN indicates certificate applicability to a desired node (e.g., web, manager, database, application, etc.). At 710, the chain of certificates and associated signatures are verified to help ensure that the certificate has been validated and will work for its intended purpose.

At 712, the certificate and instruction are sent from the management endpoint 340 of the vA 320 to the management agent 320 of the component server 330. The certificate is bound by the agent 350 and its certificate evaluator 525, and, at 714, an acknowledgement is sent back to the vA 320. At 716, the vA 320 reinitiates trust with the server 330 based on the certificate. At 718, the management agent 350 registers with the endpoint 340 using the certificate. For example, each management agent 350-356 has a node identifier (ID) that uniquely identifies the agent 350-356 in a cluster of machines 330-336 forming the system 300. When installing the agent 350-356, an address and root credentials of the primary vA 320 are entered so that the agent 350-356 can register itself in the vA 320. After the registration, communication with the vA 320 is authenticated using the certificate. In certain examples, since the certificate is used for communication between the agent 350-356 and the endpoint 340, the root credentials of the vA 320 are not persisted on the machines 330-336 after registration is complete.

At 720, trust is reinitiated by the vA 320 with the component server 332. At 722, the certificate validator of the server 332 evaluates whether the certificate is signed by a CA that is already trusted by the server 332. If so, then the certificate is trusted. If not, then, at 724, the certificate validator evaluates the certificate to determine if the certificate is self-signed. If the certificate is a self-signed certificate, then, at 726, the certificate is imported into a trusted store in case of later use, for example.

At 728, after trust is established, the vA 320 is restarted, and notification events 730, 732 are sent by the vA 320 to the nodes 330, 332 to force a restart, refresh, etc., to begin operation with the certificate.

While example implementations of the example cloud computing system 100 and virtual machine installation 300 are illustrated in FIGS. 1-7, one or more of the elements, processes and/or devices illustrated in FIGS. 1-7 may be combined, divided, re-arranged, omitted, eliminated and/or implemented in any other way. Further, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 can be implemented by hardware, software, firmware and/or any combination of hardware, software and/or firmware. Thus, for example, any of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 may include one or more elements, processes and/or devices in addition to, or instead of, those illustrated in FIGS. 1-7, and/or may include more than one of any or all of the illustrated elements, processes and devices.

Figure 8:
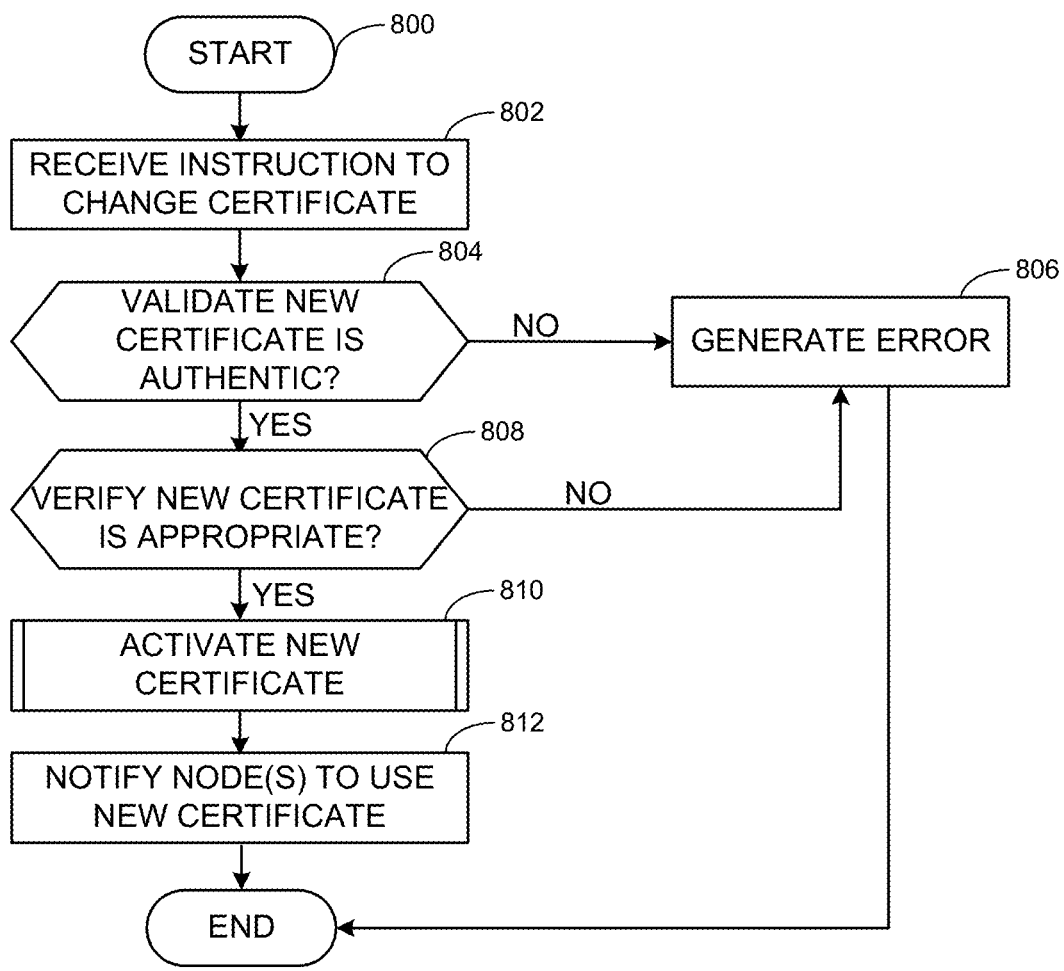
FIGS. 8-9 depict a flowcharts representative of computer readable instructions that may be executed to implement example certificate management.
Figure 9:
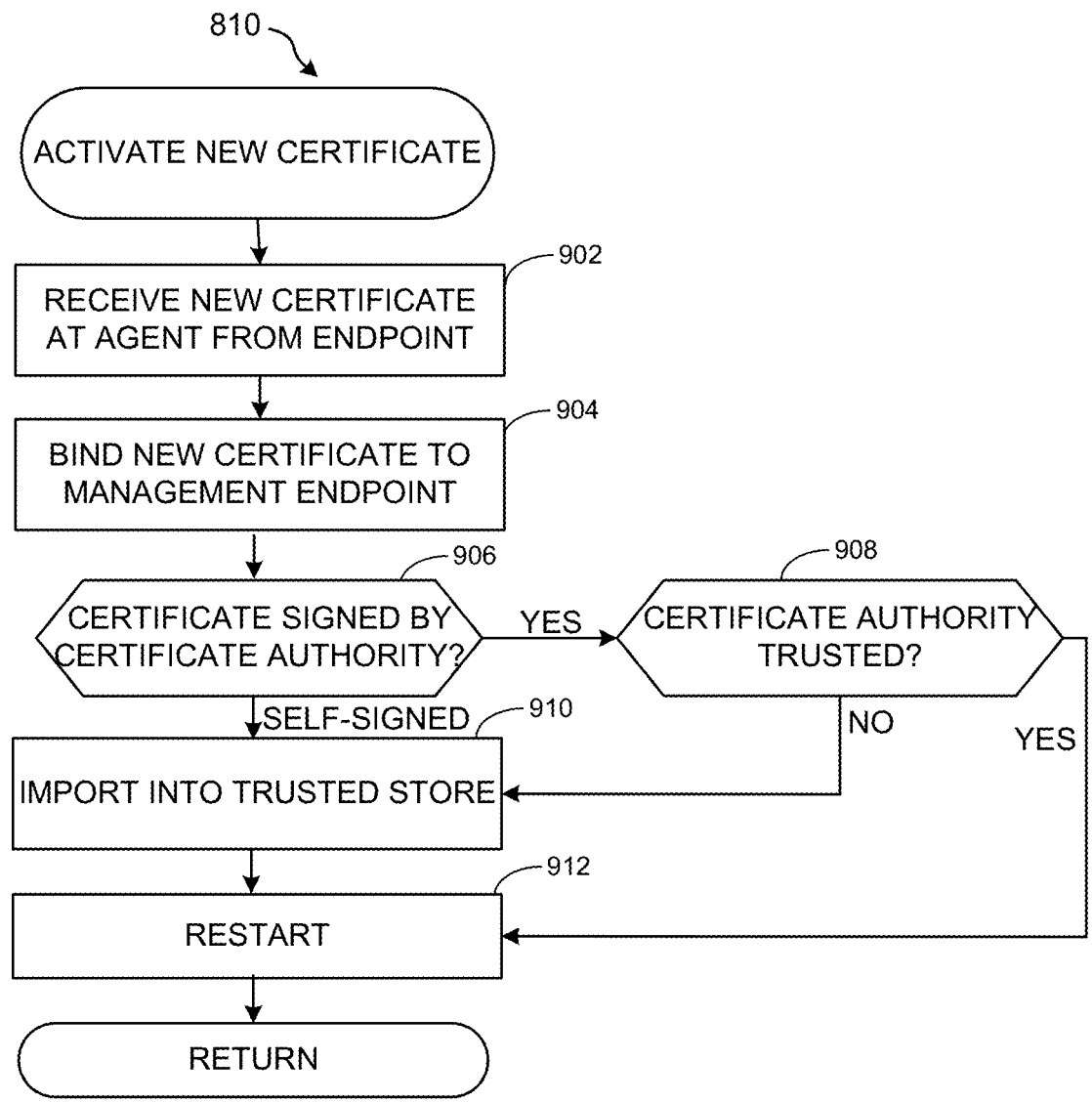

Flowcharts representative of example machine readable instructions that may be executed to deploy and manage the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 are shown in FIGS. 8-9. In these examples, the machine readable instructions implement programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 8-9, many other methods of deploying, evaluating, and installing services on component servers in accordance with the teachings of this disclosure may alternatively be used. For example, the order of execution of the blocks may be changed, and/or some of the blocks described may be changed, eliminated, or combined.

As mentioned above, the example processes of FIGS. 8-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 8-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 8 depicts a flowchart representative of computer readable instructions that may be executed to implement the example infrastructure installation 300. An example program 800 is illustrated in FIG. 8. Initially, at block 802, an instruction is received to change the certificate used for registration and authorization of servers 330-336 and associated agents 350-356 with the vA 320 and its endpoint 340.

For example, the trigger 610 (e.g., a user via a vA management webpage, an automated script, etc.) initiates a change in certificate at the vA 320 and the new certificate is provided to the vA 320.

At block 804, the new certificate is validated to determine if the certificate is authentic. For example, the vA 320 and its certificate validator 445 check a key (e.g., a public key, etc.) associated with the certificate to determine whether the key matches the certificate (e.g., a corresponding private key, etc.). For example, the certificate validator 445 can determine whether the certificate matches a web node address if the certificate is to be used for the web node, etc. The certificate validator 445 can also check the certificate common name (CN) of the certificate to determine whether the CN indicates certificate applicability to a desired node (e.g., web, manager, database, application, etc.). If the new certificate is not validated as authentic, then, at block 806, an error is generated.

If the certificate has been authenticated, then, at block 808, the certificate is verified to determine whether the certificate is appropriate for its intended role, task, purpose, etc. For example, the certificate validator 445 checks the certificate to determine it is applicable for the intended purpose/environment (e.g., Web services, manager services, application services, database services, etc.). If the certificate is not appropriate for its role/purpose, then, at block 806, an error is generated.

At block 810, if the certificate is validated and verified, then the new certificate is activated. For example, the vA 320 works with the server(s) 330-336 to deploy and bind the certificate to the server(s) 330-336 and reinitiate trust between the vA 320 and the server(s) 330-336. At block 812, the vA 320 notifies all connected node(s) 330-336 to use the new certificate in communication with the vA 320.

FIG. 9 illustrates an example implementation of executing the installation at block 810 of the example flow diagram of FIG. 8 to activate a new certificate. At block 902, the new certificate is received at the management agent 350 from the management endpoint 340. At block 904, the new certificate is bound by the agent 350 and its certificate evaluator 525 to associated the server 330 (and its agent 350) with the certificate. The agent 350 may report back to the endpoint 340 to acknowledge the binding, for example.

Each node receives a re-initiate trust action to re-initiate trust between the vA 320 and associated servers 330-336, for example. At block 906, the certificate validator of the server 332 evaluates whether the certificate is signed by a CA. If the certificate has been signed by a CA, then, at block 908, the CA is evaluated to determine whether the CA is trusted. For example, some CAs are verified and trusted and include organizations such as Verisign, etc. If the signing CA is not a trusted CA or the certificate is determined to be self-signed, then, at block 910, the signor is imported into a database such as a trusted store for use in subsequent verification, etc. In some examples, the database can be divided into a trusted store, an untrusted store, etc. At block 912, system 300 component(s) are restarted. Upon initialization on reboot, for example, component(s) operate using the new certificate.

Once complete, the vA 320 knows that the servers 330-336 associated with the vA 320 in the example system 300 have been updated to use the new certificate. The vA 320 can change certificate across multiple nodes in the system, even with a certificate from a source not previously known. In certain examples, nodes cache the certificate and read the cache periodically to retrieve and update the certificate binding, resulting in a lag before the node starts to trust the certificate. In certain examples, the vA 320 can force a restart so that all nodes trust and/or have a notify event to notify nodes to refresh their caches and validate new certificates. In certain examples, the vA 320 can restart some nodes and notify other nodes, restart all nodes, notify all nodes, etc.

Thus, certain examples provide virtual appliances 320-324 that can operate with self-signed certificates (standalone that no one can verify) and/or signed certificates (signed from client custom authority or recognized authority like Verisign, etc.). Customers can easily maintain and switch from one to the other without disrupting operation of the system 300. In certain examples, a Webpage provides a user with options to generate or input a certificate. The system can generate a client and/or self-signed certificate and/or input a certificate previously generated (e.g., from themselves, from a signing authority, etc.).

For example, the system can generate a self-signed certificate because the system has knowledge of the topology, server 330-336 names, server roles, etc., to generate the certificate. Such information is available because the vA 320 can leverage the management endpoint 340—management agent 350-356 communication channel to retrieve the information (e.g., the agent 350-356 and endpoint 340 can communicate to retrieve the server name of a server 330-336 to be added in the subject alternative name (SAN) field of the certificate, for example).

Figure 10:
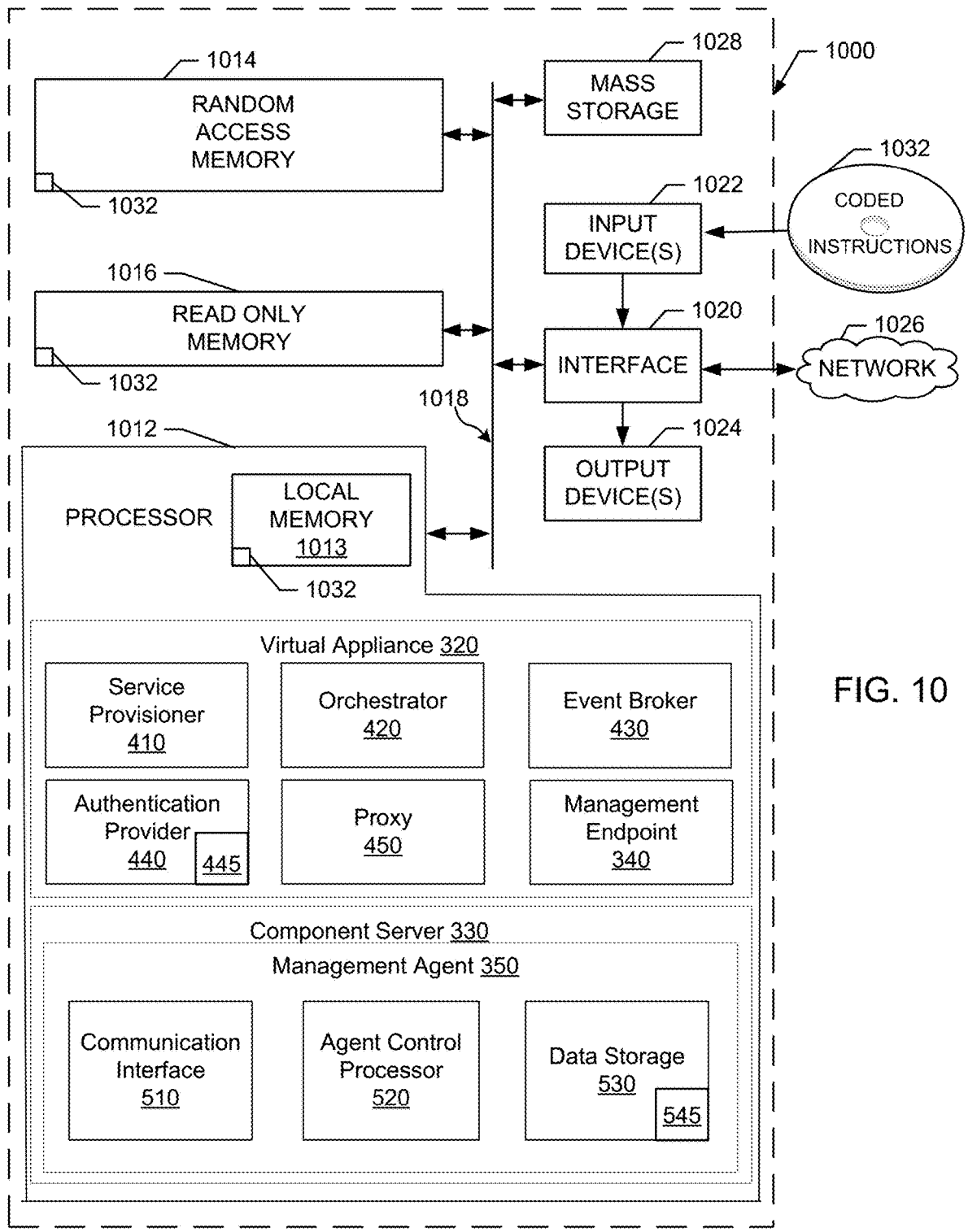
FIG. 10 is a block diagram of an example processing platform capable of executing the example machine-readable instructions of FIGS. 8-9.

FIG. 10 is a block diagram of an example processor platform 1000 capable of executing the instructions of FIGS. 8-9 to implement the example systems, operation, and management of FIGS. 1-7. The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache), and executes instructions to implement the example systems 100, 300 or portions thereof, such as the vA 320-324, component server 330-336, management endpoint 340-344, and management agent 350-356. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include flash devices, floppy disk drives, hard drive disks, optical compact disk (CD) drives, optical Blu-ray disk drives, RAID systems, and optical digital versatile disk (DVD) drives.

Coded instructions 1032 representative of the example machine readable instructions of FIGS. 8-9 may be stored in the mass storage device 1028, in the volatile memory 1014, in the non-volatile memory 1016, and/or on a removable tangible computer readable storage medium such as a CD or DVD.

In certain examples, the processor 1012 can be used to implement the virtual appliance 320 (and vAs 322-324) and the component server 330 (and servers 332-336) and their components including the service provisioner 410, orchestrator 420, event broker 430, authentication provider 440, certificate validator 445, proxy 450, management endpoint 340, management agent 450, communication interface 510, agent control processor 520, certificate evaluator 525, data storage 530, etc.

From the foregoing, it will be appreciated that the above disclosed methods, apparatus and articles of manufacture facilitate installation of a virtual appliance and associated component servers as an IaaS in a distributed environment such as a cloud computing environment and management of agents in the distributed environment. Examples disclosed herein facilitate self-evaluation and installation of servers and agents and authentication of communications via certificate without further user intervention or cloud oversight.

As described above, rather than requiring customers to manually install the IaaS on each component server, the installation of each node can be facilitated from a centralized location via a management endpoint and management agents running on each component server. The management agents are registered with the virtual appliance, and further communication between the agent and the appliance is authenticated using a self-signed certificate and/or CA-signed certificate, etc. The appliance's root credentials are not persisted on the individual component servers. Each instance of the management agent has a node identifier, which uniquely identifies the node in the cluster of machines forming the infrastructure deployment.

Certain examples provide an apparatus including a first virtual appliance including a first management endpoint and a first authentication provider including a first certificate validator, the first certificate validator to validate that a first certificate received by the first authentication provider is authentic, virtual appliance to communicate the first certificate via the first management endpoint; and a first component server including a first management agent and a first certificate evaluator, the first management agent to communicate with the first virtual appliance via the first management endpoint, the first management agent to receive the first certificate via the first management endpoint, the first certificate evaluator to evaluate the first certificate to determine a signing authority, the first management agent to restart the first component server and notify the first virtual appliance of acceptance of the first certificate.

In certain examples, when the signing authority is a trusted certificate authority, the first management agent is to trust the first certificate, and, when the signing authority is at least one of an untrusted certificate authority or a self-signed certificate, the signor is to be imported into a trusted property store.

In certain examples, the first certificate validator is to validate the first certificate by checking that a private key stored by the first authentication provider matches a public key included in the first certificate.

In certain examples, the first certificate validator is to validate each signed element of the first certificate, wherein the first certificate includes a chain of a plurality of signed elements.

In certain examples, the first management authority is to bind the first component server to the first certificate.

In certain examples, the example apparatus further includes a second component server including a second management agent and a second certificate evaluator, the second management agent to communicate with the first virtual appliance via the first management endpoint, the second management agent to receive the first certificate via the first management endpoint, the second certificate evaluator to evaluate the first certificate to determine a signing authority, the second management agent to restart the second component server and notify the first virtual appliance of acceptance of the first certificate.

In certain examples, the first certificate is sent to the first authentication provider in a certificate change operation, the certificate change operation to reconfigure the first virtual appliance and nodes connected to the first virtual appliance, including the first component server, to use the first certificate to authenticate communication.

Certain examples provide a method including validating, using a first virtual appliance including a first management endpoint and a first authentication provider including a first certificate validator, that a first certificate received by the first authentication provider is authentic, the first virtual appliance to communicate the first certificate via the first management endpoint; receiving, at a first component server including a first management agent and a first certificate evaluator, the first certificate via the first management endpoint; evaluating, using the first certificate evaluator, the first certificate to determine a signing authority; restarting, using the first management agent, the first component server; and notifying the first virtual appliance of acceptance of the first certificate.

In certain examples, when the signing authority is a trusted certificate authority, the first management agent is to trust the first certificate, and, when the signing authority is at least one of an untrusted certificate authority or a self-signed certificate, the signor is to be imported into a trusted property store.

In certain examples, the first certificate validator is to validate the first certificate by checking that a private key stored by the first authentication provider matches a public key included in the first certificate.

In certain examples, the first certificate validator is to validate each signed element of the first certificate, wherein the first certificate includes a chain of a plurality of signed elements.

In certain examples, the method further includes binding, using the first management authority, the first component server to the first certificate.

In certain examples, a second component server includes a second management agent and a second certificate evaluator, the second management agent to communicate with the first virtual appliance via the first management endpoint, the second management agent to receive the first certificate via the first management endpoint, the second certificate evaluator to evaluate the first certificate to determine a signing authority, the second management agent to restart the second component server and notify the first virtual appliance of acceptance of the first certificate.

In certain examples, the first certificate is sent to the first authentication provider in a certificate change operation, the certificate change operation to reconfigure the first virtual appliance and nodes connected to the first virtual appliance, including the first component server, to use the first certificate to authenticate communication.

Certain examples provide a computer readable storage medium including instructions that, when executed, cause a machine to at least: validate, using a first virtual appliance including a first management endpoint and a first authentication provider including a first certificate validator, that a first certificate received by the first authentication provider is authentic, the first virtual appliance to communicate the first certificate via the first management endpoint; receive, at a first component server including a first management agent and a first certificate evaluator, the first certificate via the first management endpoint; evaluate, using the first certificate evaluator, the first certificate to determine a signing authority; restart, using the first management agent, the first component server; and notify the first virtual appliance of acceptance of the first certificate.

In certain examples, when the signing authority is a trusted certificate authority, the first management agent is to trust the first certificate, and, when the signing authority is at least one of an untrusted certificate authority or a self-signed certificate, the signor is to be imported into a trusted property store.

In certain examples, the first certificate validator is to validate the first certificate by checking that a private key stored by the first authentication provider matches a public key included in the first certificate.

In certain examples, the first certificate validator is to validate each signed element of the first certificate, wherein the first certificate includes a chain of a plurality of signed elements.

In certain examples, the instructions, when executed, further cause the machine to bind, using the first management authority, the first component server to the first certificate.

In certain examples, the first certificate is sent to the first authentication provider in a certificate change operation, the certificate change operation to reconfigure the first virtual appliance and nodes connected to the first virtual appliance, including the first component server, to use the first certificate to authenticate communication.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a virtual appliance, of a plurality of virtual appliances, including a management endpoint and an authentication provider,
the authentication provider including a certificate validator,
the certificate validator to validate, when triggered in response to a change in certificate by the authentication provider, that the certificate is authentic,
the virtual appliance to communicate the certificate via the management endpoint; and
a first component server including a first management agent and a certificate evaluator, the first management agent to communicate with the virtual appliance via the management endpoint,
the first management agent to receive the certificate via the management endpoint, the certificate evaluator to evaluate whether to accept the certificate by determining a signing authority for the certificate,
the first management agent to restart the first component server to activate the certificate in response to acceptance of the certificate by the certificate evaluator and to notify the virtual appliance of the acceptance of the certificate via the management endpoint to register the first management agent with the management endpoint and to authenticate communication between the first component server and the virtual appliance via the first management agent and the management endpoint using the certificate,
the first management agent to synchronize the first component server with the virtual appliance using the management endpoint and the certificate,
wherein, based on the acceptance of the certificate, the management endpoint is to send a notification to a second component server including a second management agent, the notification to instruct the second management agent to reinitiate trust with the management endpoint and to communicate with the management endpoint using the certificate,
the first management agent and the second management agent to poll the virtual appliance, in a configurable time interval based on the trust and the certificate, via the management endpoint to obtain commands to be executed by at least a corresponding one of the first component server and the second component server.

2. The apparatus of claim 1, wherein when the signing authority is a trusted certificate authority, the first management agent is to trust the certificate, and, when the signing authority is at least one of an untrusted certificate authority or a self-signed certificate, the signing authority is to be imported into a trusted property store.

3. The apparatus of claim 1, wherein the certificate validator is to validate the certificate by checking that a private key stored by the authentication provider matches a public key included in the certificate.

4. The apparatus of claim 1, wherein the certificate includes a chain of signed elements and the certificate validator is to validate the signed elements of the certificate.

5. The apparatus of claim 1, wherein the first management agent is to bind the first component server to the certificate.

6. The apparatus of claim 1, wherein the certificate evaluator is a first certificate evaluator, and wherein the second component server includes a second certificate evaluator, the second management agent to communicate with the virtual appliance via the management endpoint, the second management agent to receive the certificate via the management endpoint, the second certificate evaluator to evaluate the certificate to determine a signing authority, the second management agent to restart the second component server and to notify the virtual appliance of acceptance of the certificate.

7. The apparatus of claim 1, wherein the certificate is sent to the authentication provider in a certificate change operation, the certificate change operation to reconfigure the virtual appliance and nodes connected to the virtual appliance, including the first component server, to use the certificate to authenticate communication.

8. A method comprising:
validating, with an authentication provider of a virtual appliance, of a plurality of virtual appliances, triggered in response to a change in certificate, that the certificate is authentic,
the virtual appliance to communicate the certificate via a management endpoint of the virtual appliance;
evaluating the certificate, with a certificate evaluator of a first component server, to determine a signing authority;
when the certificate is accepted by the certificate evaluator, restarting the first component server to activate the certificate;
notifying the virtual appliance of acceptance of the certificate via the management endpoint to register a first management agent of the first component server with the management endpoint and to authenticate communication between the first component server and the virtual appliance via the management endpoint using the certificate;
synchronizing the first component server with the virtual appliance using the management endpoint, the first management agent, and the certificate;
based on the acceptance of the certificate, sending a notification to a second component server including a second management agent, the notification to instruct the second management agent to reinitiate trust with the management endpoint and to communicate with the management endpoint using the certificate; and
processing polling of the virtual appliance, in a configurable time interval, by the first management agent and the second management agent, based on the trust and the certificate, via the management endpoint to obtain commands to be executed by at least a corresponding one of the first component server and the second component server.

9. The method of claim 8, further including: when the signing authority is a trusted certificate authority, trusting the certificate; and, when the signing authority is at least one of an untrusted certificate authority or a self-signed certificate, importing the signing authority into a trusted property store.

10. The method of claim 8, further including validating the certificate by checking that a private key stored by the authentication provider matches a public key included in the certificate.

11. The method of claim 8, wherein the certificate includes a chain of signed elements to be validated.

12. The method of claim 8, further including binding the first component server to the certificate.

13. The method of claim 8, wherein the certificate evaluator is a first certificate evaluator, the method further including: receiving, at the second component server including the second management agent and a second certificate evaluator, the certificate via the management endpoint; evaluating the certificate to determine a signing authority; restarting the second component server; and notifying the virtual appliance of acceptance of the certificate.

14. The method of claim 8, further including sending the certificate to the authentication provider in a certificate change operation, the certificate change operation to reconfigure the virtual appliance and nodes connected to the virtual appliance, including the first component server, to use the certificate to authenticate communication.

15. A tangible computer readable storage medium comprising instructions that, when executed, cause a first component server to at least:
evaluate a certificate from a management endpoint of a virtual appliance, of a plurality of virtual appliances, to determine a signing authority, the virtual appliance to include a certificate validator that validates, when triggered in response to a change in the certificate, that the certificate is authentic; and
when the certificate is accepted:
restart the first component server to activate the certificate;
notify the virtual appliance of acceptance of the certificate via the management endpoint to register a first management agent of the first component server with the management endpoint and to authenticate communication between the first component server and the virtual appliance via the management endpoint using the certificate, the first management agent to synchronize the first component server with the virtual appliance using the management endpoint and the certificate;
based on the acceptance of the certificate, send a notification to a second component server including a second management agent, the notification to instruct the second management agent to reinitiate trust with the management endpoint and to communicate with the management endpoint using the certificate; and
process polling of the virtual appliance, in a configurable time interval, by the first management agent and the second management agent, based on the trust and the certificate, via the management endpoint to obtain commands to be executed by at least a corresponding one of the first component server and the second component server.

16. The storage medium of claim 15, wherein when the signing authority is a trusted certificate authority, the instructions cause the first component server to trust the certificate, and, when the signing authority is at least one of an untrusted certificate authority or a self-signed certificate, the instructions cause the first component server to import the signing authority into a trusted property store.

17. The storage medium of claim 15, wherein the instructions cause the first component server to validate the certificate by checking that a stored private key matches a public key included in the certificate.

18. The storage medium of claim 17, wherein the instructions cause the first component server to validate each signed element of the certificate.

19. The storage medium of claim 15, wherein the instructions, when executed, further cause the first component server to bind the first component server to the certificate.

20. The storage medium of claim 15, wherein the instructions, when executed, further cause the first component server to receive the certificate in a certificate change operation, the certificate change operation to reconfigure the virtual appliance and nodes connected to the virtual appliance, including the first component server, to use the certificate to authenticate communication.

21. The apparatus of claim 1, wherein the first management agent and the second management agent are registered to the virtual appliance, the first management agent and the second management agent associated with the management endpoint to enable communication between the virtual appliance, the first component server, and the second component server using the management endpoint, the first management agent, the second management agent, and the certificate.

\* \* \* \* \*